S. H. GOLDBERG.
MACHINE FOR COUNTING AND ARRANGING HAIRPINS OR LIKE ARTICLES.
APPLICATION FILED FEB. 23, 1918.

1,326,925.

Patented Jan. 6, 1920.

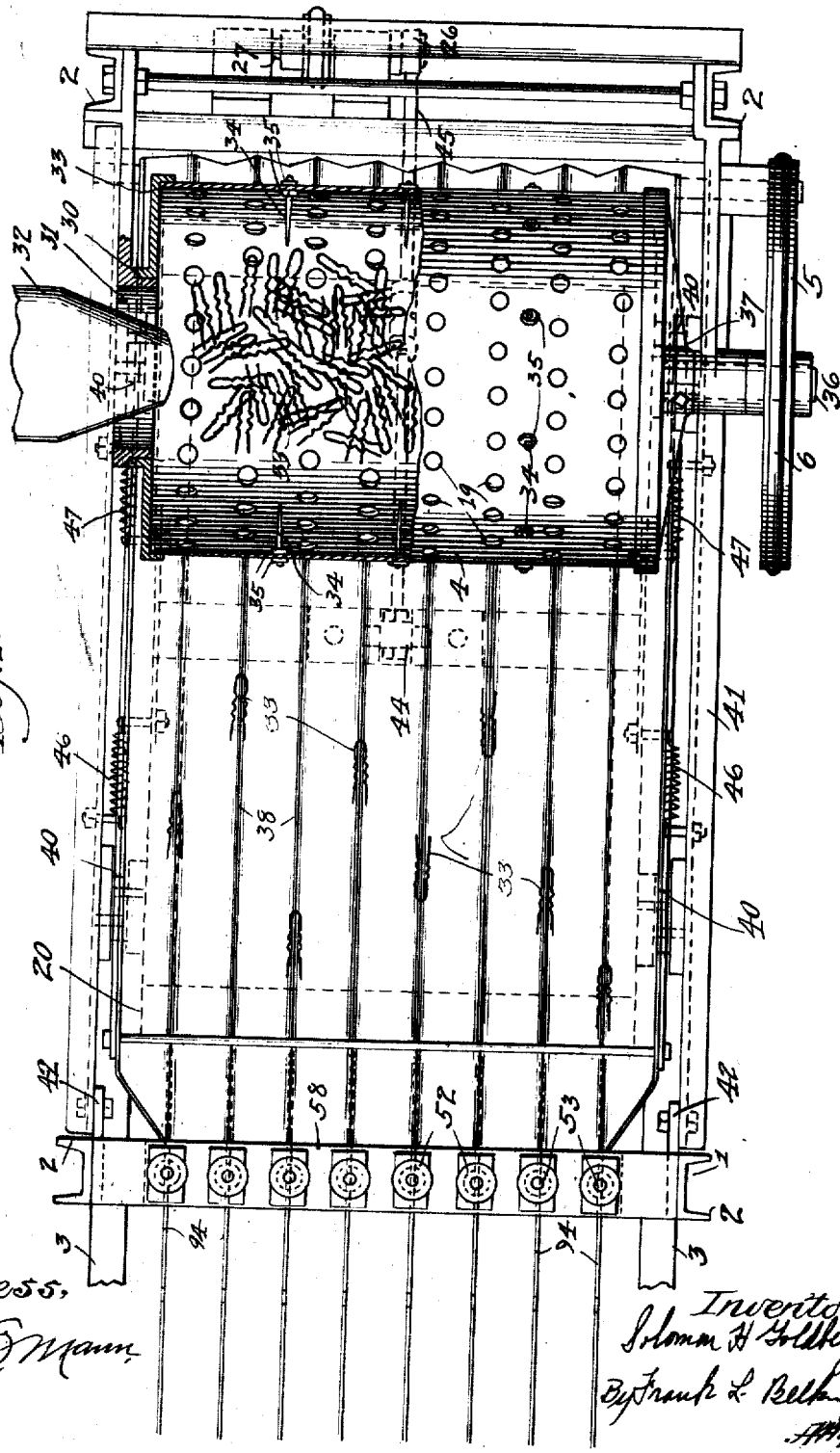

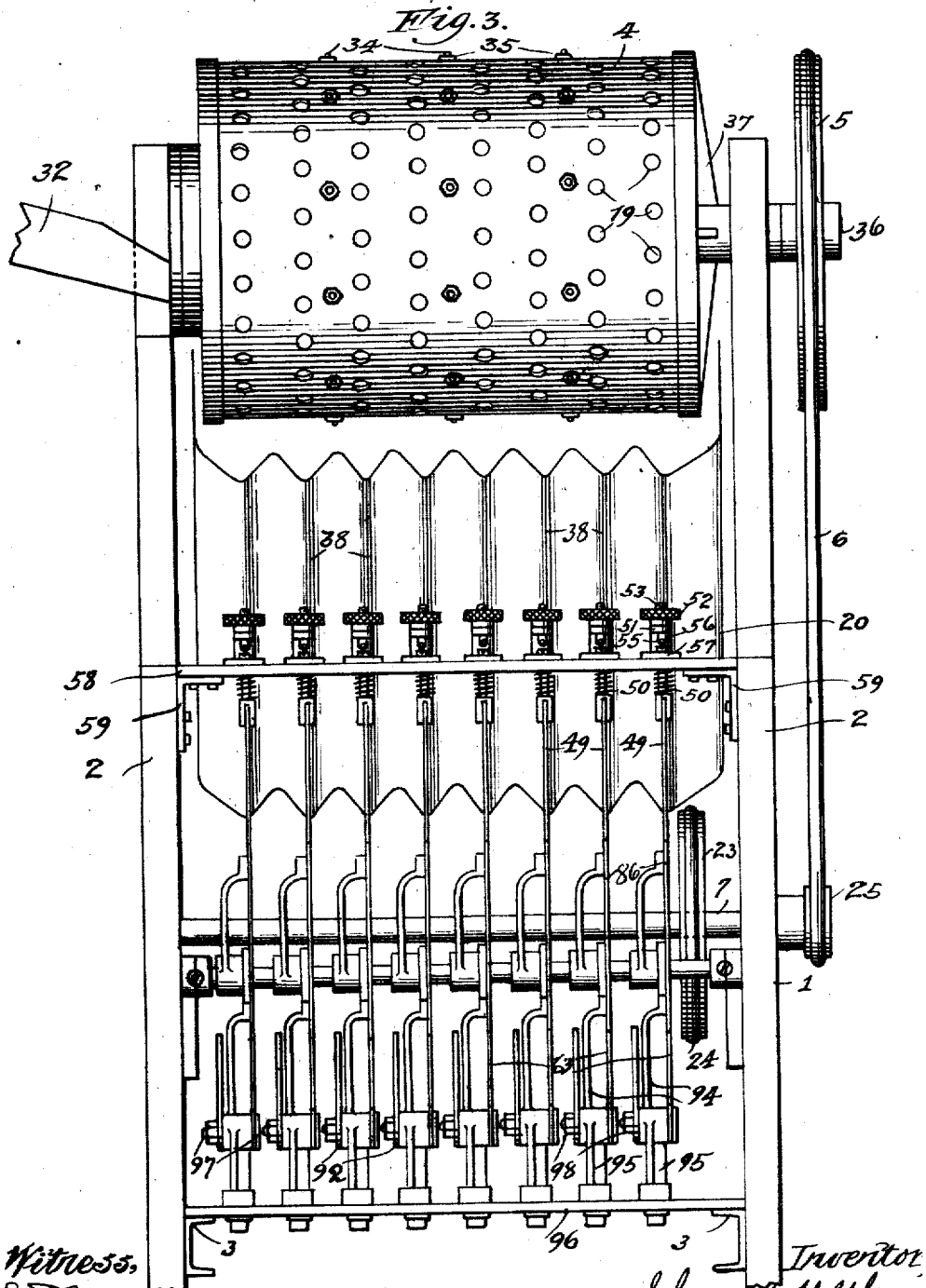

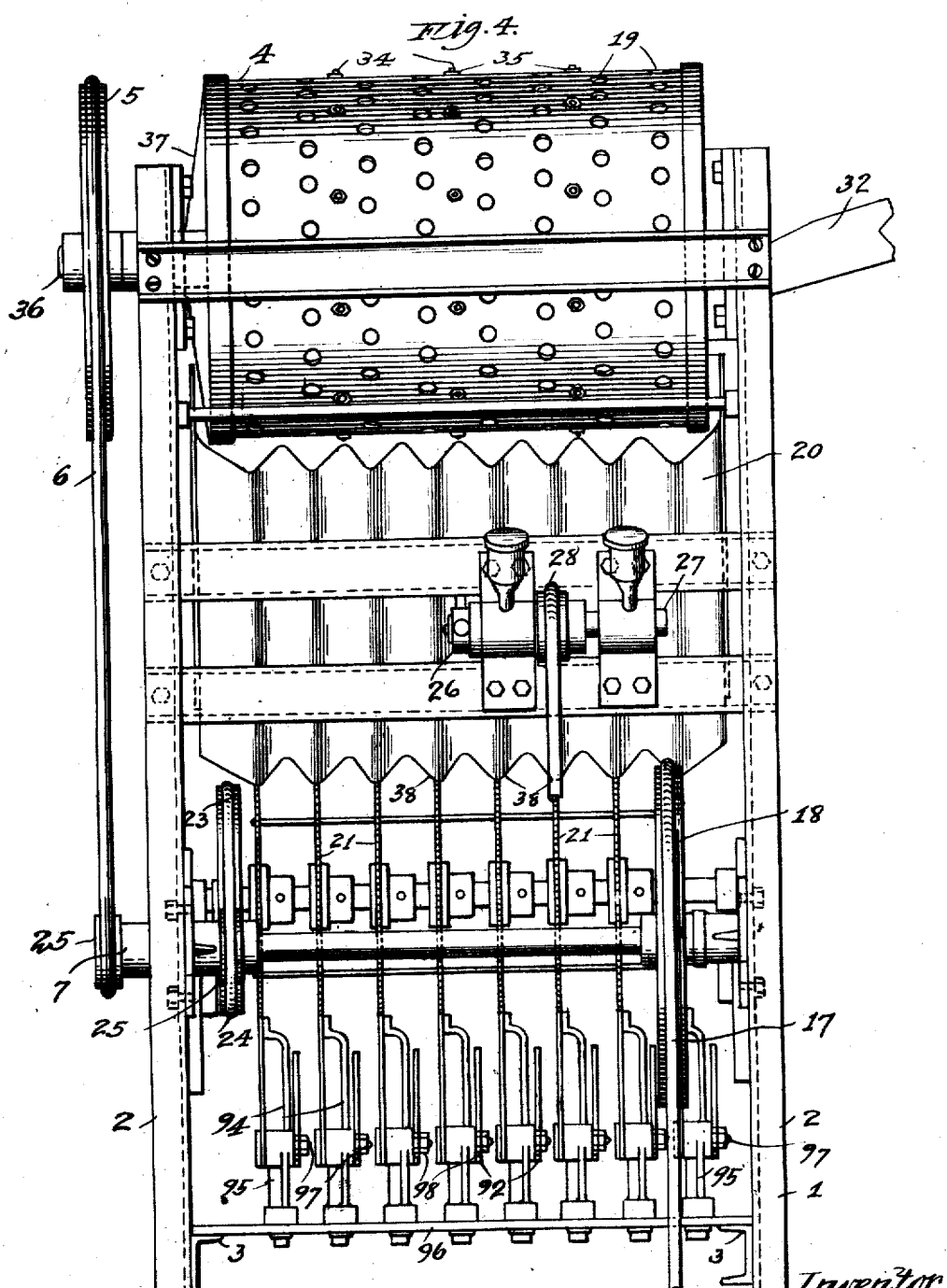

S. H. GOLDBERG.
MACHINE FOR COUNTING AND ARRANGING HAIRPINS OR LIKE ARTICLES.
APPLICATION FILED FEB. 23, 1918.
1,326,925.
Patented Jan. 6, 1920.
7 SHEETS—SHEET 5.
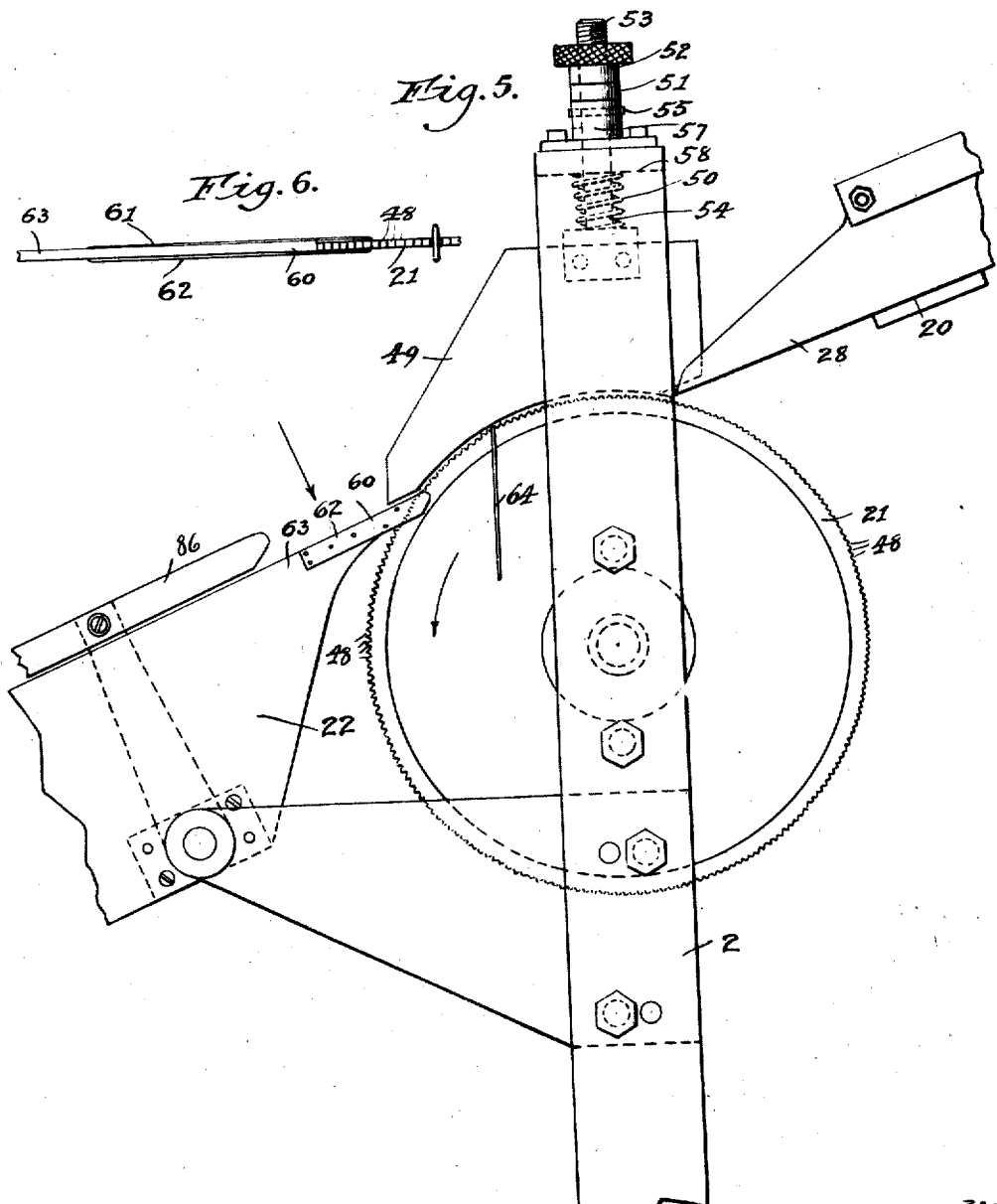

S. H. GOLDBERG.
MACHINE FOR COUNTING AND ARRANGING HAIRPINS OR LIKE ARTICLES.
APPLICATION FILED FEB. 23, 1918.
1,326,925.
Patented Jan. 6, 1920.
7 SHEETS—SHEET 6.
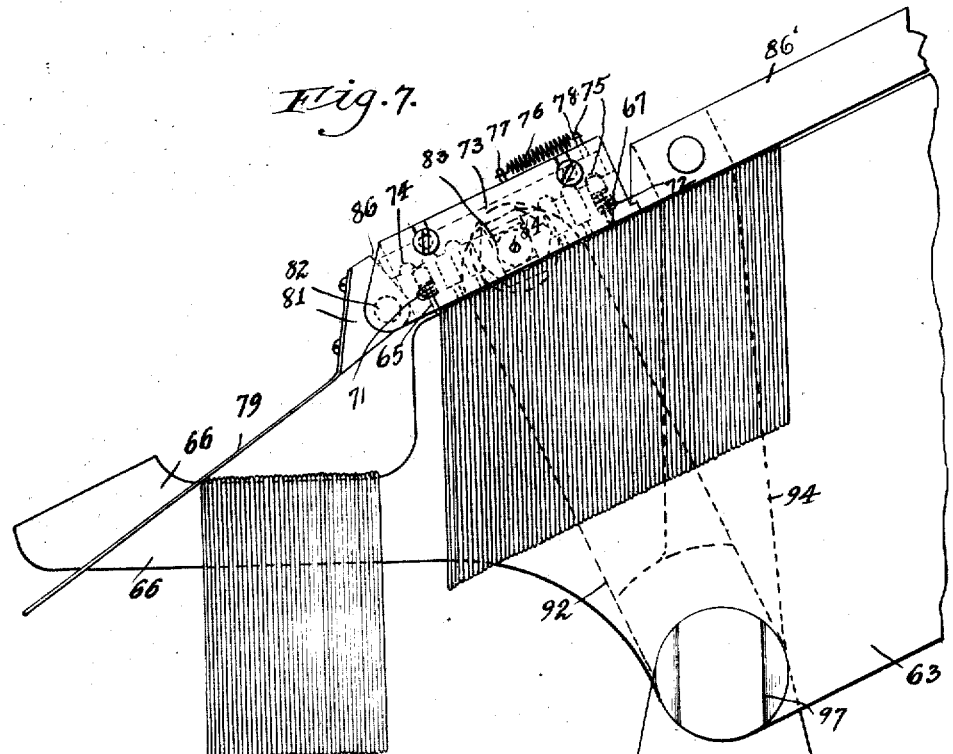
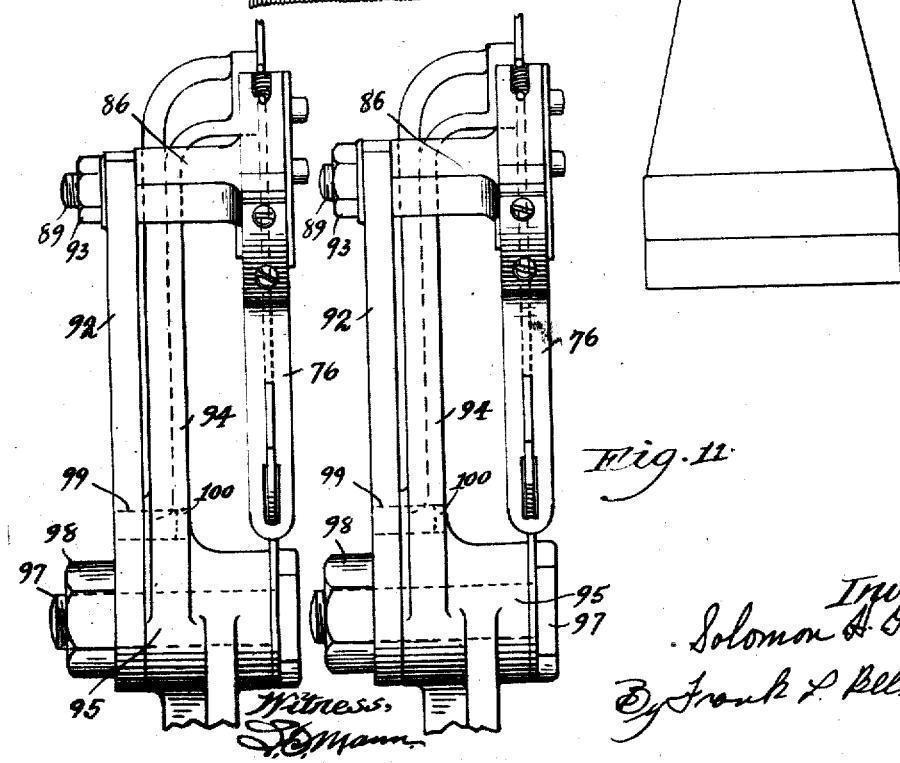

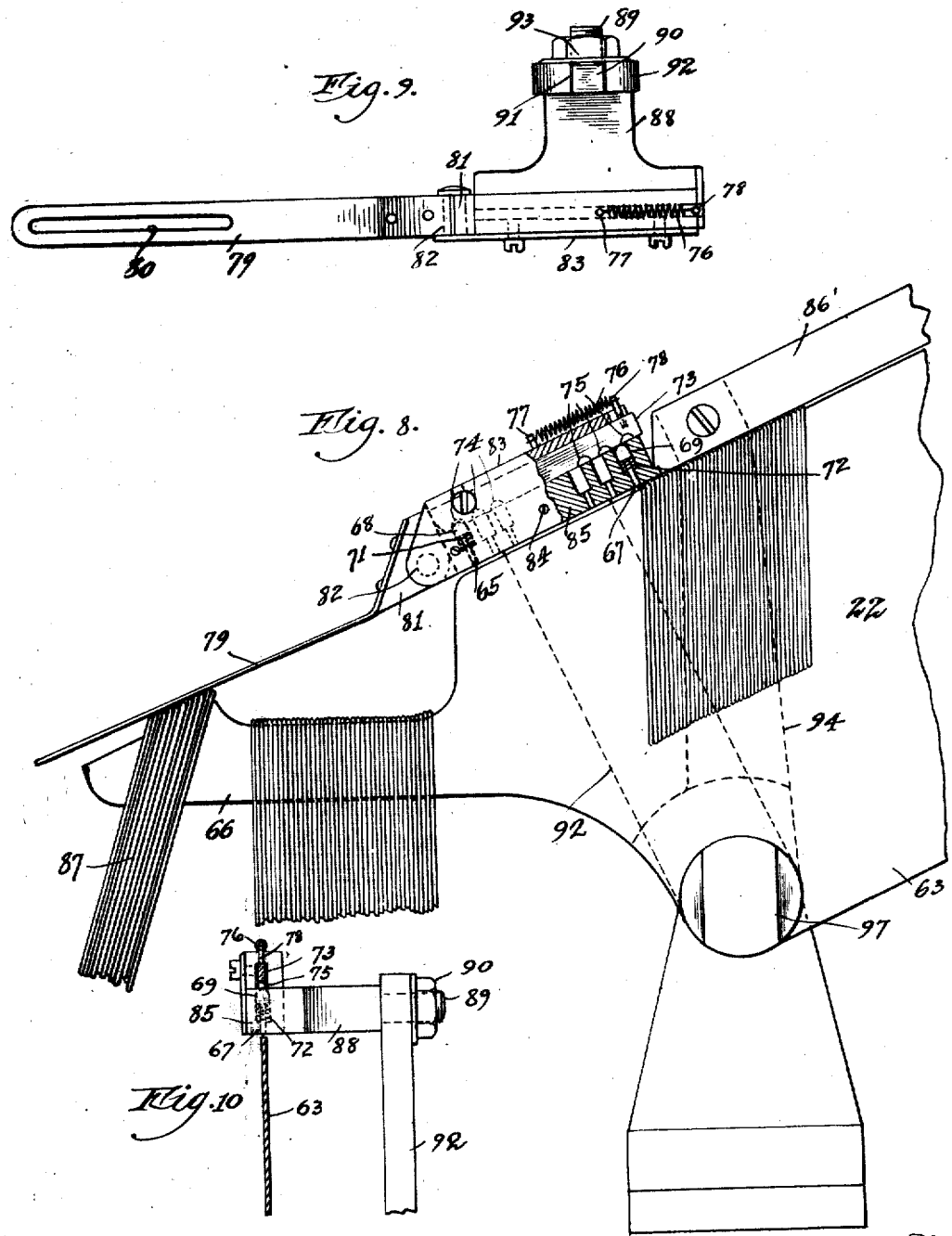

UNITED STATES PATENT OFFICE.

SOLOMON H. GOLDBERG, OF CHICAGO, ILLINOIS, ASSIGNOR TO THE HUMP HAIRPIN MANUFACTURING COMPANY, OF CHICAGO, ILLINOIS, A CORPORATION OF WEST VIRGINIA.

MACHINE FOR COUNTING AND ARRANGING HAIRPINS OR LIKE ARTICLES.

1,326,925.

Specification of Letters Patent.     Patented Jan. 6, 1920.

Application filed February 23, 1918. Serial No. 218,627.

*To all whom it may concern:*

Be it known that I, SOLOMON H. GOLDBERG, a citizen of the United States, residing in the city of Chicago, county of Cook, and State of Illinois, have invented certain new and useful Improvements in Machines for Counting and Arranging Hairpins or like Articles, of which the following is a specification.

This invention relates to machines for counting and arranging hairpins or like articles, and it is among the salient objects of the invention to take a mass of hairpins or like articles which come into the machine in miscellaneous positions and automatically arrange to count the hairpins and preferably group a predetermined number of hairpins so that they can be conveniently removed and packed.

Other objects of the invention are to provide a machine which can handle hairpins or like articles of different things and in which the heads of the pins will be arranged in the same direction irrespective of their position when fed into the machine; to provide a machine which will rapidly and accurately count and arrange the hairpins; to provide an apparatus which will materially decrease the manual labor of packing hairpins or like articles and in which an absolute accurate count or grouping of the pins will take place.

The invention also resides in the novel arrangement of the arranging and feeding mechanism; in the construction of the counting mechanism and the arrangement whereby groups of different predetermined numbers can be automatically counted and then removed from the machine; and in the arrangement whereby the removal of one group automatically releases another group in the counting or selecting mechanism. The invention further resides in such features and construction and arrangement and combinations of parts as will more fully hereinafter appear.

In the drawings:

Fig. 2 is an enlarged plan view, parts being omitted and other parts broken away for clearness of illustration.

Fig. 3 is an enlarged front elevation of the upper part of the machine.

Fig. 4 is a rear view of the upper part of the machine, parts being omitted and other parts broken away for the sake of clearness of illustration.

Fig. 5 is an enlarged fragmentary side elevational view of the serrated selective wheel.

Fig. 6 is the top plan view of the stripper finger.

Fig. 7 is an enlarged fragmentary side elevational view of the counting mechanism.

Fig. 8 is a view similar to Fig. 7 showing the parts adjusted to the removal position of the pins.

Fig. 9 is a top plan view of the spring releasing lever and associated mechanism.

Fig. 10 is a fragmentary transverse view partly in section through the latching mechanism.

Fig. 11 is an enlarged end elevation showing two of the counting and releasing mechanisms.

Figure 1:
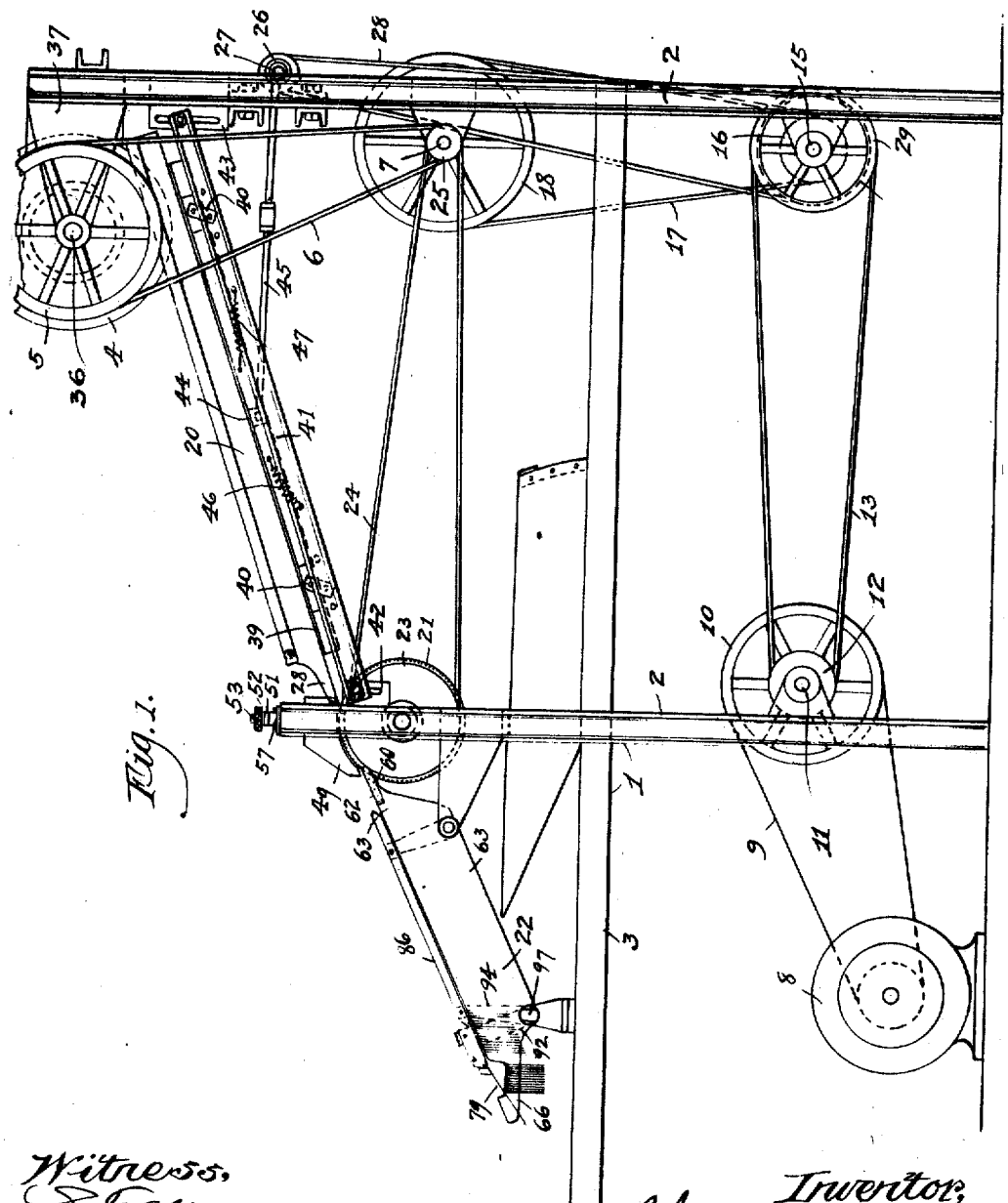
Figure 1 is a side elevational view of a machine embodying my invention.

Describing in detail the particular embodiment of my invention disclosed in the drawings and referring first to the general construction and arrangement of parts as shown in Fig. 1, 1 designates the frame which comprises uprights 2 and supporting bars 3 in which the mechanism is mounted. At the upper end of the machine there is a revolubly mounted drum 4, driven by a wheel 5 and belt 6 from a cross shaft 7. This shaft is driven from the motor 8 by means of the belt 9, wheel 10, idler shaft 11 and pulley 12, belt 13, shaft 15, pulley 16, belt 17 and belt wheel 18.

The hairpins or other articles fed into the rotating drum are discharged through suitable apertures 19 in the latter, onto an agitated trough or apron 20. From the apron the articles are discharged onto the selecting mechanism which comprises a selective disk 21 and from the latter onto the counting mechanism 22. The selecting disks are driven in timed relation to the drum by means of a belt wheel 23, belt 24 and pinioned 25 on shaft 7. The agitator is operated by means of an eccentric 26 on the stub shaft 27 which is driven by a belt 28 passing over the belt wheel 29 on the cross shaft 15. It will thus be seen that various mechanisms are all driven from the same motor or other source of power and are driven in predetermined timed relation to each other.

Describing now in detail the various steps in the operation of the machine and referring first to the sorting drum 4, it will be noticed in Fig. 2, that at one end the drum is mounted on an enlarged bearing 30 in which there is provided a suitable opening 31 through which the hairpins or other articles may be fed into the interior of the drum 4. For facilitating the feeding of the articles into the drum I may employ a chute 32 which receives its supply of the articles either by hand or from a continuous conveyer or other automatic feed. Irrespective of the manner of feeding the hairpins into the drum after they are once inserted into the latter, they are tumbled about and separated through contact with pins 33 which project inwardly from the walls of the drum. These pins comprise a threaded stud member 34 having an inner and outer locking nut 35, which nuts are clamped upon the opposite sides of the walls of the drum. The other end of the drum is provided with a stub shaft 36 mounted in suitable bearings 37 and driven by pulley 5 and belt 6. The walls of the drum have the apertures 19 arranged in rows which discharge into the corresponding grooves 38 arranged in the trough or apron 20. The apertures 19 are of a size to permit one hairpin or other article to be discharged at a time into the troughs, the articles thus reaching the troughs in an elongated position but the heads of the pins may project forwardly or rearwardly without in any way interfering with the selecting mechanism.

It will be noticed in Fig. 1 that trough or apron 20 is arranged in inclined relation but in order to insure the pins being fed down the incline toward the selecting mechanism, the trough or apron 20 is given a vibratory movement. For this purpose, the frame 39 of the trough or apron 20 is pivotally connected by links 40 to side bar members 41, which side bar members are vertically adjustably secured in plates 42 and 43 respectively. The center cross bar 44 of the apron frame is connected by link or rod 45 to the eccentric 26 on the stub shaft 27. The arrangement of parts last described is such that whenever the machine is driven the eccentric will reciprocate the rod 45 and impart a vibratory movement to the trough or apron 20. For holding the frame of the latter in its normal position, there are employed pairs of springs 46 and 47. As the pins are discharged upon the apron they are guided by grooves 38 to the corresponding selecting disks 21. Each of these disks has its periphery notch or serration, the notches or serrations 48 being of such size as to accommodate a single hairpin or other article. To insure the engagement of the pin with the serrations or notches 48 on the disks 21, there is employed a guide plate or shoe 49, there being one of these guide plates or shoes for each one of the selecting disks. As shown in Fig. 3, each of the guide plates or shoes is spring pressed toward the selecting disk by means of springs 50, the tension of which can be controlled by adjusting nuts 51 and 52 on threaded end 53 of the stud 54. To avoid the clogging of the machine in case an exceptionally thick hairpin or other articles passes beneath the plate, the stud 54 is provided with a cross pin 55 which slides in a groove 56 in the cap or housing 57. These various caps or housings in the associated parts of the retaining plates or shoes are carried by a cross bar 58, which in turn are carried by angle plates 59 on uprights 2. The drive connection is such that the selecting disks 21 are driven in the direction of the arrow as indicated in Fig. 5, and as they pass downward during the rotation, the pins 64 are automatically engaged by stripper finger 60 which is preferably formed of space plates 61 and 62, bolted to the plate 63. The arrangement is such that the free ends of the stripper finger extend upon opposite sides of the outer edge of the selecting disks 21 and automatically lift the pins out of the serrations or notches 48, after which the pins slide downward over the upper edge of the plate 63.

Taking up now in detail the counting mechanism and referring particularly to Figs. 7 to 11 both inclusive, it will be noticed that the pins as they slide down the inclined edge of the plate 63 strike against the pin or stop 65 which prevents them from passing on to the discharge arm 66. As shown in Fig. 7, the discharge arms are of a size to receive an entire group of hairpins or other articles of the particular number desired. The number of pins which are discharged on to the arm 66 at any one time is governed by the distance between the stop 65 and the auxiliary stop 67. The stops 65 and 67 are provided with heads 68 and 69 which are spring pressed outwardly by springs 71 and 72 respectively. After governing the position of the stops 65 and 67, there is employed a sliding bar 73 which has its lower edges provided with a plurality of notches 74 and 75. A spring 76 which has one end fastened to a stationery pin 77 and a pin 78 carried by bar 73, tends to normally slide the latter rearwardly to the position shown in Fig. 7. In this position the head of the stop 67 registers with one of the recesses 75 and the spring 72 holds the auxiliary stop 67 out of engagement with the hairpins or other articles on the plate 63. When, however, the operator attempts to remove a group of pins from the arm 66, it is necessary, in order to get the pins off from the arm, to slide them against the spring releasing lever 79. There is one of these levers for each of the discharge arms 66 and they are perforatively slotted at 80 so as to fit down over the end of the arm 66. Each spring releasing lever has one end connected to a block 81 pivotally mounted at 82 to a stationary plate 83. This plate is secured by screws or other suitable securing devices 84 to the block 85 which carries the stops 65 and 67. The pivoted block 81 has a shoulder 86 which registers with the end of the sliding bar 73, so that whenever the block is rocked about its pivot when the levers 79 are moved to the position shown in Fig. 8 for removing the hairpins or other articles, the bar 73 will be automatically adjusted to the position shown in Fig. 8. In this position the auxiliary stop 67 is forced down into the path of the pins while the spring 71, acting on the head 68 of the stop 65, draws the main stop 65 out of the path of the pins and allows the entire group of pins which are at the left of the auxiliary stop 67 to slide down onto the arm 66. Inasmuch as the distance between the main stop 65 and the auxiliary stop 67 are fixed, the number of pins in each group released onto the discharge arm will be the same. However, in order to permit of groups of different numbers, the block 85 is provided with several recesses for each stop so that groups of several different sizes can be taken care of by simple adjustment of changing the position of one or both of the stops also to insure the pins passing into the engagement with the stops, a retaining bar 86' is arranged just above the upper edge of the plate 63. The block 85 has an integral offset portion 88 which terminates in a threaded stud 89. The stud 89 has a square projection 90 which fits into a recess 91 in arm 92, and the stud is locked in engagement with the arm by means of a nut 93. This arm 92 forms the support for the block 85 and its associated mechanism, it being of course understood that there is one of these supporting arms for each block, two of which arms are shown in Fig. 11. In addition to the arm 92, there is a second supporting arm 94 which carries the retaining members 86, the arm 94 being an integral part of the casting 95, which is carried by cross bar 96. Arm 92 is tied to the casting 95 by means of a bolt 97 and a nut 98, a suitable centering pin 99 projecting into a recess 100 in arm 94, being employed for this purpose. After the group of pins marked 87 have been removed from the arm 66, the lever 79 will be free to return to the position shown in Fig. 7, the spring 76 then sliding the bar back to its normal position wherein the main stop 65 is projected into the path of the articles on plates 63 and the auxiliary stop 67 is withdrawn.

From the above description it will be apparent that the pins after once being fed, either by hand or automatically, into the drum are automatically fed, guided, arranged, mounted and released in groups onto the discharge arm 66. From this latter member they may be either removed automatically or by hand and the removal of the pins will cause a new group to be released as fast as one group is taken from the discharge arm. In this manner it is not necessary for the pins to be removed at exactly the same speed as formed but in order to insure the continuous operation of the machine the removal of the pins from the discharge arm 66 should be at a rate sufficient to avoid an excessive accumulation on plate 63.

While I have shown and described a preferred embodiment of my invention, the invention is not limited to the particular details of construction or to the particular combinations and arrangements of parts described, except as elementally set forth in claims.

I claim as my invention:

1. In a machine for handling hairpins or like articles the combination with feeding mechanism for advancing the plurality of hairpins or like articles, a main stop normally pressed into the path of movement of such articles, an auxiliary stop normally spring pressed out of the path of such articles, and a movable member adapted in one position of adjustment to force the auxiliary stop into the path of the articles, and a spring for automatically withdrawing the main stop out of the path of the said articles when the auxiliary stop is adjusted into their path.

2. In a machine for handling hairpins or like articles the combination with feeding mechanism for advancing the plurality of hairpins or like articles, a main stop normally pressed into the path of movement of such articles, an auxiliary stop normally spring pressed out of the path of such articles, and a movable member adapted in one position of adjustment to force the auxiliary stop into the path of the articles, and a spring for automatically withdrawing the main stop out of the path of the said articles when the auxiliary stop is adjusted into their path, and spring controlled means for automatically adjusting said movable member to return said stops to their normal position.

3. In a machine for handling hairpins or like articles the combination with means for feeding forward the plurality of such articles, a main stop against which such articles strike, a discharge arm, an operating lever arranged to normally prevent the removal of articles from said discharge arm, and means actuated by the movement of said lever for automatically withdrawing said main stop to permit the feeding of a new group to said discharge arm upon the removal of the previous group therefrom.

4. In a machine for handling hairpins or like articles the combination with means for feeding forward the plurality of such articles, a main stop against which such articles strike, a discharge arm, an operating lever arranged to normally prevent the removal of articles from said discharge arm, and means actuated by the movement of said lever for automatically withdrawing said main stop to permit the feeding of a new group to said discharge arm upon the removal of the previous group therefrom, and an auxiliary stop to force into the path of movement of such articles whenever the main stop is withdrawn whereby the articles released are divided into groups of predetermined number.

5. In a machine for handling hairpins, the combination with feeding mechanism, stop mechanism, discharge mechanism, mechanism for normally preventing the removal of articles from the discharge mechanism and means for automatically actuating the stop mechanism to permit the feeding of a new group of articles to the discharge mechanism upon the removal of the previous group therefrom.

SOLOMON H. GOLDBERG.